United States Patent
Kimura (10) Patent No.: US 9,903,742 B2
(45) Date of Patent: Feb. 27, 2018

(54) DISPLACEMENT DETECTING DEVICE

(71) Applicant: MITUTOYO CORPORATION, Kawasaki-shi, Kanagawa (JP)

(72) Inventor: Akihide Kimura, Tokorozawa (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 83 days.

(21) Appl. No.: 15/220,487

(22) Filed: Jul. 27, 2016

(65) Prior Publication Data

US 2017/0030745 A1 Feb. 2, 2017

(30) Foreign Application Priority Data

Jul. 28, 2015 (JP) ................................. 2015-148382

(51) Int. Cl.
*G01D 5/34* (2006.01)
*G01D 5/26* (2006.01)
*G01D 5/38* (2006.01)

(52) U.S. Cl.
CPC ............. *G01D 5/266* (2013.01); *G01D 5/38* (2013.01)

(58) Field of Classification Search
CPC .................................. G01D 5/38; G01D 5/266
See application file for complete search history.

(56) References Cited

U.S. PATENT DOCUMENTS

| | | | |
|---|---|---|---|
| 2004/0090637 A1 | 5/2004 | Holzapfel et al. | |
| 2005/0140985 A1 | 6/2005 | Takahashi | |
| 2007/0102630 A1* | 5/2007 | Igaki ..................... | G01D 5/38 |
| | | | 250/231.16 |
| 2007/0267571 A1 | 11/2007 | Makinouchi et al. | |

FOREIGN PATENT DOCUMENTS

| | | |
|---|---|---|
| DE | 19716058 | 10/1998 |
| JP | 6-97171 | 11/1994 |
| JP | 8-219812 | 8/1996 |
| JP | 4856844 | 11/2011 |
| JP | 4938926 | 3/2012 |
| KR | 20130014184 | 2/2013 |

OTHER PUBLICATIONS

European Search Report dated Dec. 7, 2016, 9 pages.

* cited by examiner

*Primary Examiner* — Thanh Luu
(74) *Attorney, Agent, or Firm* — Rankin, Hill & Clark LLP (57) ABSTRACT

A displacement detecting device includes a main scale and a detecting head unit. The detecting head unit includes a light source, a light receiving unit, and an index scale group that is disposed in the middle of a light path from the main scale to the light receiving unit. The index scale group includes two or more index scales including diffraction gratings, respectively. A positive s-th order diffracted light and a negative s-th order diffracted light of diffracted lights from the main scale are used as the signal lights. The displacement detecting device satisfies a first condition and a second condition, the first condition being expressed as follows: $\lambda \times (u1-u2) \times (mN \div g) = 2 \times \sin \alpha$, the second condition being expressed as follows: $\lambda \times u1 \times (mN \div g) - \sin \alpha \neq \lambda \div g \times \sum_{i=1}^{N} (ti \times mi)$.

2 Claims, 10 Drawing Sheets

DISPLACEMENT DETECTING DEVICE

CROSS-REFERENCE TO RELATED APPLICATION

The present application claims priority from Japanese Patent Application No. 2015-148382 filed on Jul. 28, 2015, the entire content of which is incorporated herein by reference.

BACKGROUND

Technical Field

The present invention relates to a displacement detecting device, and more specifically, to a photoelectric encoder.

Related Art

As displacement detecting devices, photoelectric encoders using diffraction gratings are being widely used. A photoelectric encoder makes two beams diffracted by a scale diffraction grating interfere with each other, and obtains an interference signal. On the basis of this interference signal, the photoelectric encoder detects the relative displacement amount and relative displacement direction between the scale diffraction grating and a detecting head unit.

In order to obtain an interference signal, the photoelectric encoder makes two diffracted lights interfere with each other. If only two diffracted lights interfere with each other, an ideal interference fringe (an interference signal) is obtained, so theoretical detection accuracy is supposed to be obtained. In many cases, as two diffracted lights which are made interfere with each other, for example, a positive first-order diffracted light and a negative first-order diffracted light are made interfere with each other.

However, in diffracted lights which are generated by diffraction of the scale diffraction grating, there are not only the positive and negative first-order diffracted lights, but also higher-order diffracted lights, and a zero-order light attributable to simple reflection (or transmission), not to diffraction. If such an unintended stray light is mixed with the interference signal, in the interference signal, a period other than its original period is included. Then, the interference signal is not ideal, and thus measurement accuracy remarkably decreases.

Figure 1:
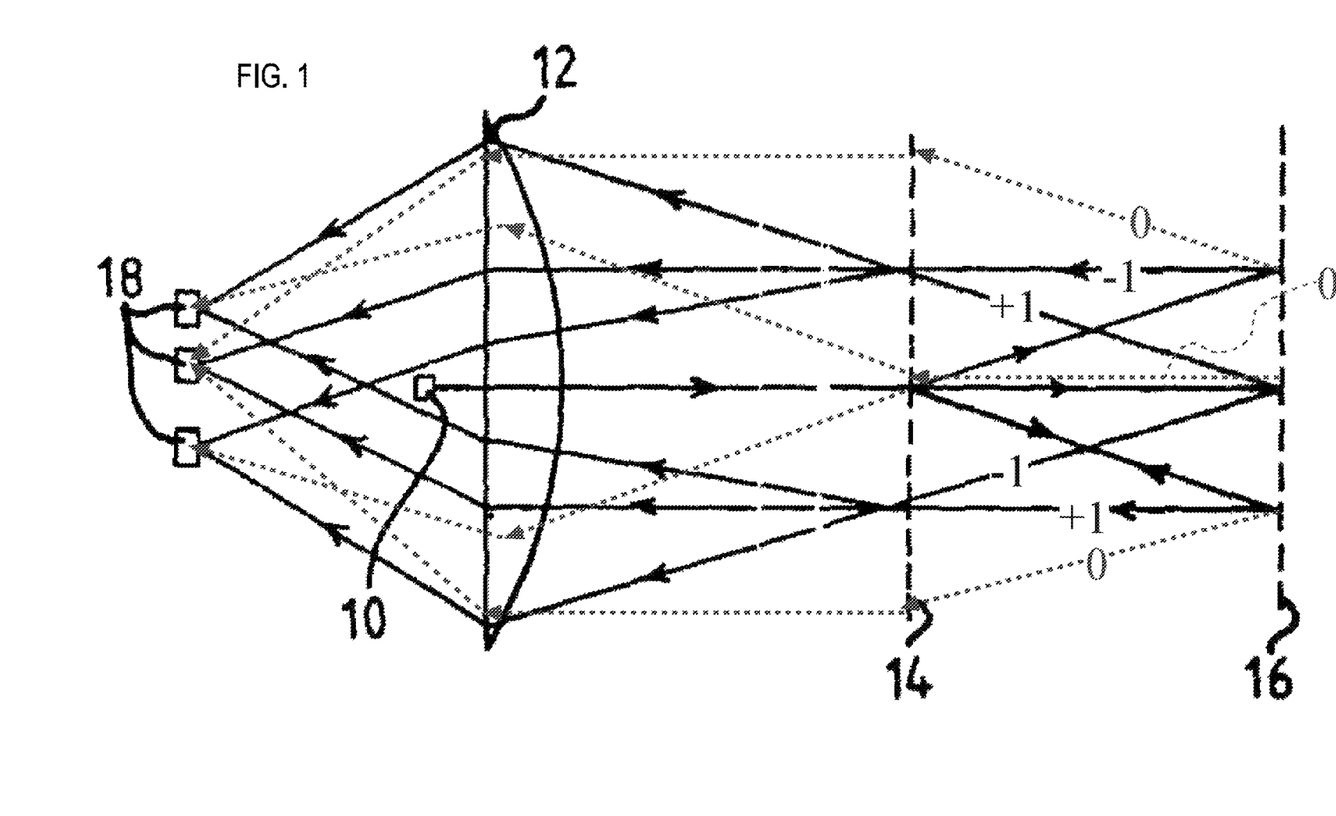
FIG. 1 is a view illustrating a displacement measuring device disclosed in Japanese Patent Application Publication No. 6-097171.

For example, FIG. 1 shows a displacement measuring device disclosed in Japanese Patent Application Publication No. 6-097171.

Its optical system is composed mainly of a diffraction grating, and has a very simple structure. In this displacement measuring device, not only positive and negative first-order lights but also a zero-order light enters a photoelectric detector 18. Here, the grating height h of an index scale 14 is adjusted such that the phase difference between the positive or negative first-order light and the zero-order light which are generated by the index scale 14 becomes a predetermined phase (a phase difference Ω).

It is desirable to implement the displacement measuring device as designed; however, even a very slight manufacturing error of the index scale 14 or a very slight deviation in the wavelength of light of a light source causes disturbance in detection signals, whereby the measurement accuracy remarkably decreases.

Figure 2:
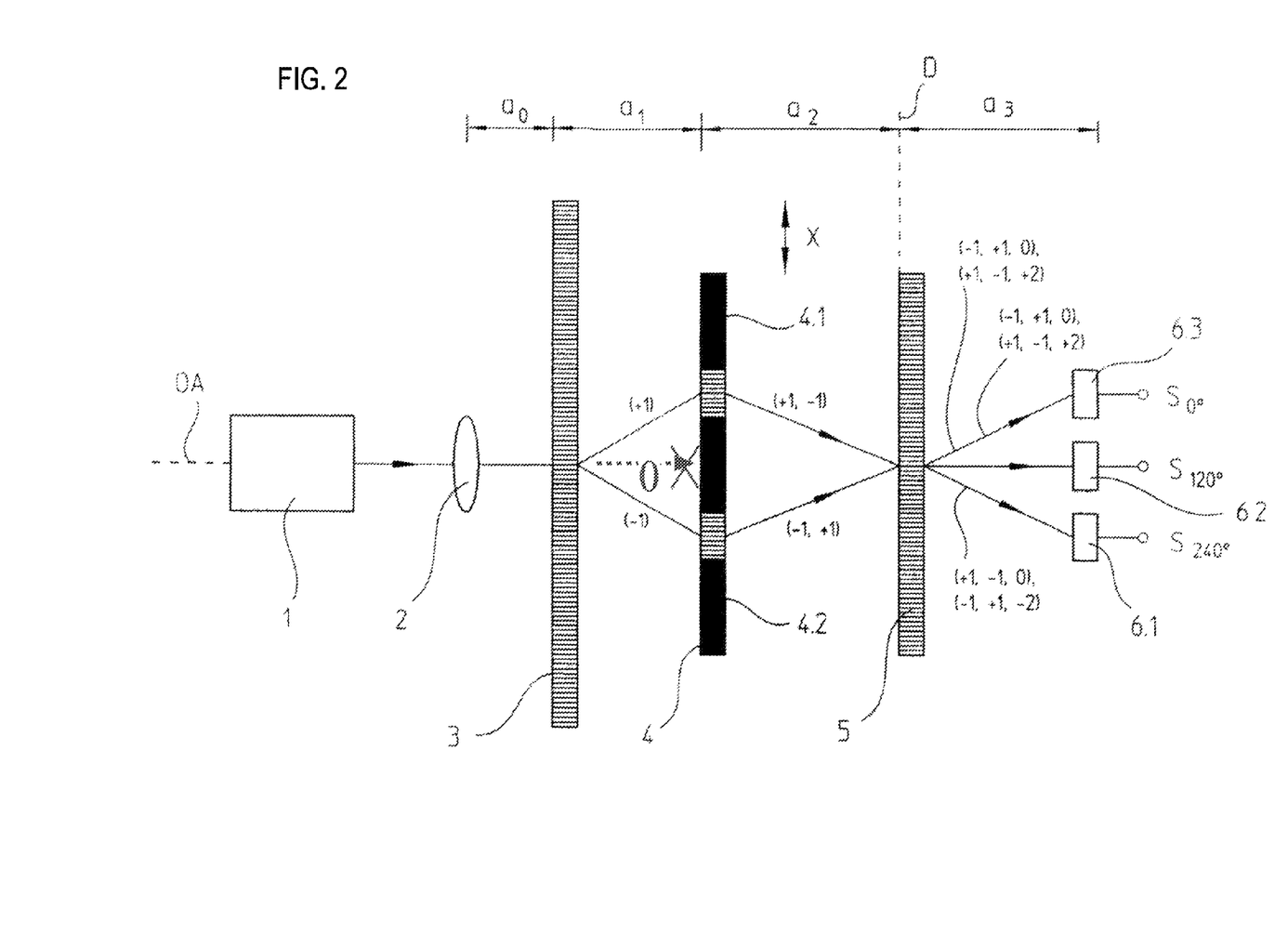
FIG. 2 is a view illustrating a displacement measuring device disclosed in Japanese Patent No. 4856844.

As an idea for solving this problem, there is an idea of blocking a zero-order light from a scale diffraction grating, for example, as shown in FIG. 2, such that the zero-order light does not enter a light receiving unit (Japanese Patent No. 4856844).

However, in this structure, in order to surely block the zero-order light with a mask, it is necessary to set the diameter of an incident light sufficiently small. However, in this case, even if the scale diffraction grating is contaminated very slightly, the amount of diffracted light significantly varies. Therefore, a problem that the structure becomes extremely sensitive to contamination of the scale occurs.

Now, another example of the related art will be introduced.

Figure 3:
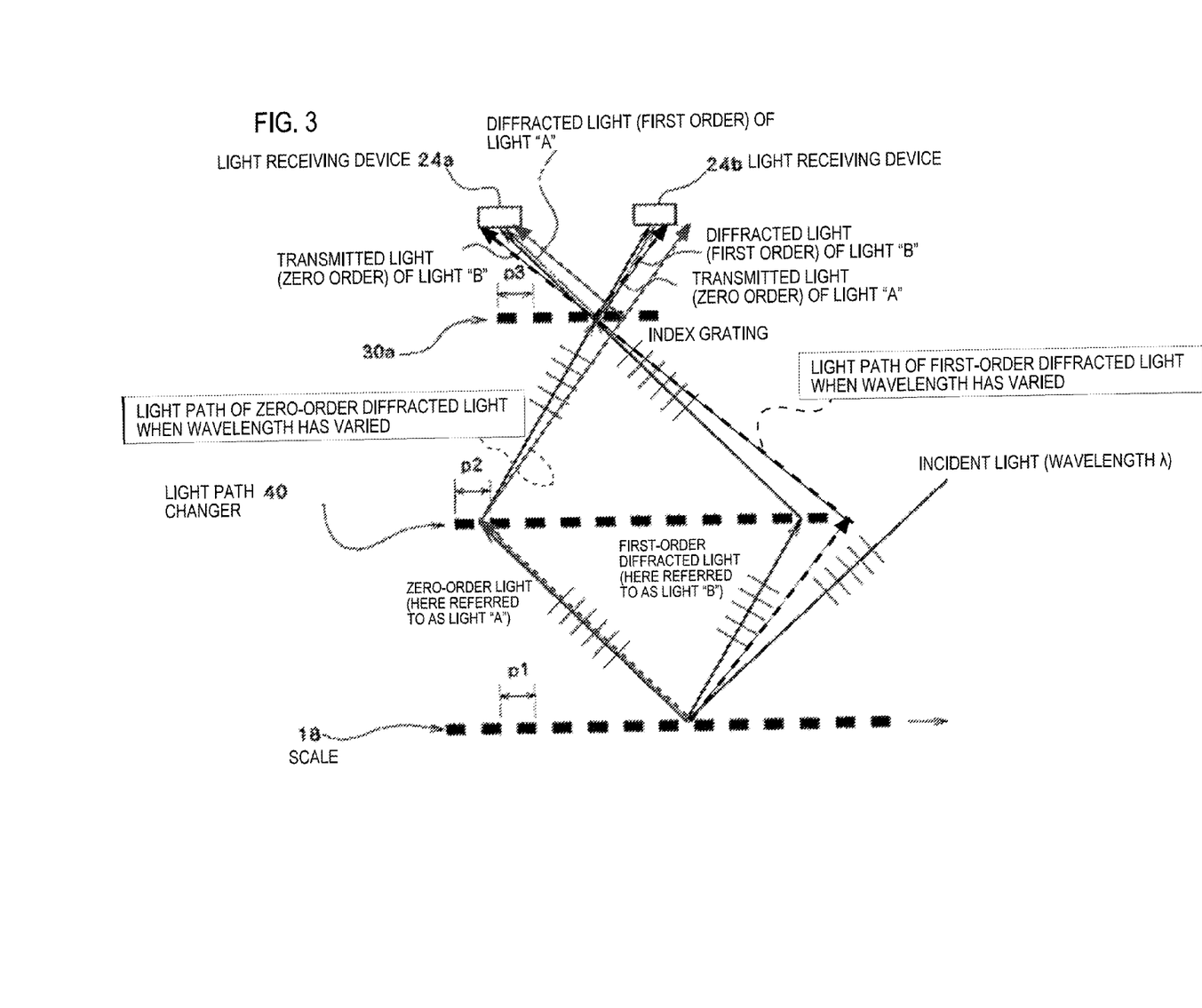
FIG. 3 is a view illustrating a displacement measuring device disclosed in Japanese Patent No. 4938926.

FIG. 3 shows a configuration example of an optical encoder proposed by the applicant of the present invention (Japanese Patent No. 4938926).

In this optical encoder, light of a light source obliquely enters a scale diffraction grating. Further, a zero-order light is not a noise light, and is used as a signal light. In other words, two beams of the zero-order light and a first-order diffracted light interfere with each other. As a result, disturbance of detection signals attributable to the incident zero-order light on a light receiving unit is indirectly solved.

Patent Document 1: Japanese Patent Application Publication No. 6-097171
Patent Document 2: Japanese Patent No. 4856844
Patent Document 3: Japanese Patent No. 4938926

The configuration of the optical encoder disclosed in Japanese Patent No. 4938926 is a revolutionary idea; however, the inventor of the present invention discovered the following problem.

It is assumed that the wavelength of light of the light source has varied. In this case, the diffraction angle (reflection angle) of the zero-order light does not vary.

However, according to the variation in the wavelength, the diffraction angle of a first-order diffracted light varies. Then, the lengths of left and right light paths (the length of the light path of the zero-order light and the length of the light path of the first-order diffracted light) become asymmetrical, resulting in a difference between the light path lengths, whereby an interference signal (an interference fringe) is changed.

As described above, variation in the wavelength of light of the light source has a great influence on detection accuracy.

SUMMARY

Exemplary embodiments of the invention provide a high-accuracy photoelectric encoder, which obtains an interference signal by making two beams diffracted by a scale diffraction grating interfere with each other and has robustness to variation in the wavelength of light of a light source and contamination of the scale diffraction grating.

A displacement detecting device according to an exemplary embodiment of the invention, comprising:
a main scale including a diffraction grating; and
a detecting head unit that is disposed so as to be relatively movable with respect to the main scale, and detects the amount of relative displacement to the main scale,
wherein the detecting head unit includes:
a light source that emits light toward the main scale;
a light receiving unit that receives signal lights diffracted by the main scale, the signal lights being a positive s-th order diffracted light and a negative s-th order diffracted light of diffracted lights from the main scale, and an index scale group that is disposed in the middle of a light path from the main scale to the light receiving unit, the index scale group including two or more index scales including diffraction gratings, respectively, and wherein the displacement detecting device satisfies a first condition and a second condition, the first condition being expressed as follows:

$$\lambda \times (u1-u2) \times (mN \div g) = 2 \times \sin \alpha,$$

the second condition being expressed as follows:

$$\lambda \times u1 \times (mN \div g) - \sin \alpha \neq \lambda \div g \times \Sigma_{i=1}^{N}(ti \times mi).$$

The meaning of each of parameters will be apparent during the explanation of the embodiments.

N, m1, m2, u1, and u2 may be 2, 1, 2, 1, and 0, respectively.

DETAILED DESCRIPTION

An embodiment of the present invention will be described with reference to the drawings which illustrate the embodiment and in which individual components are denoted by reference symbols.

Description of Principle of Present Invention

Figure 4:
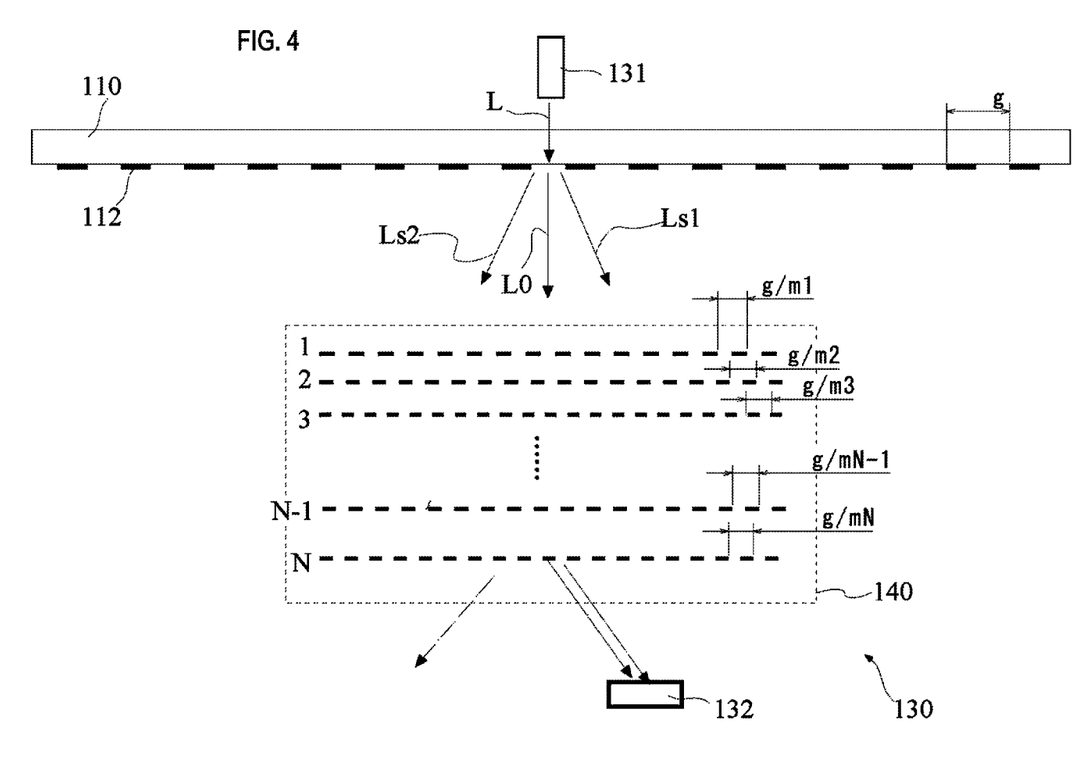
FIG. 4 is a view for explaining the present invention.
Figure 5:
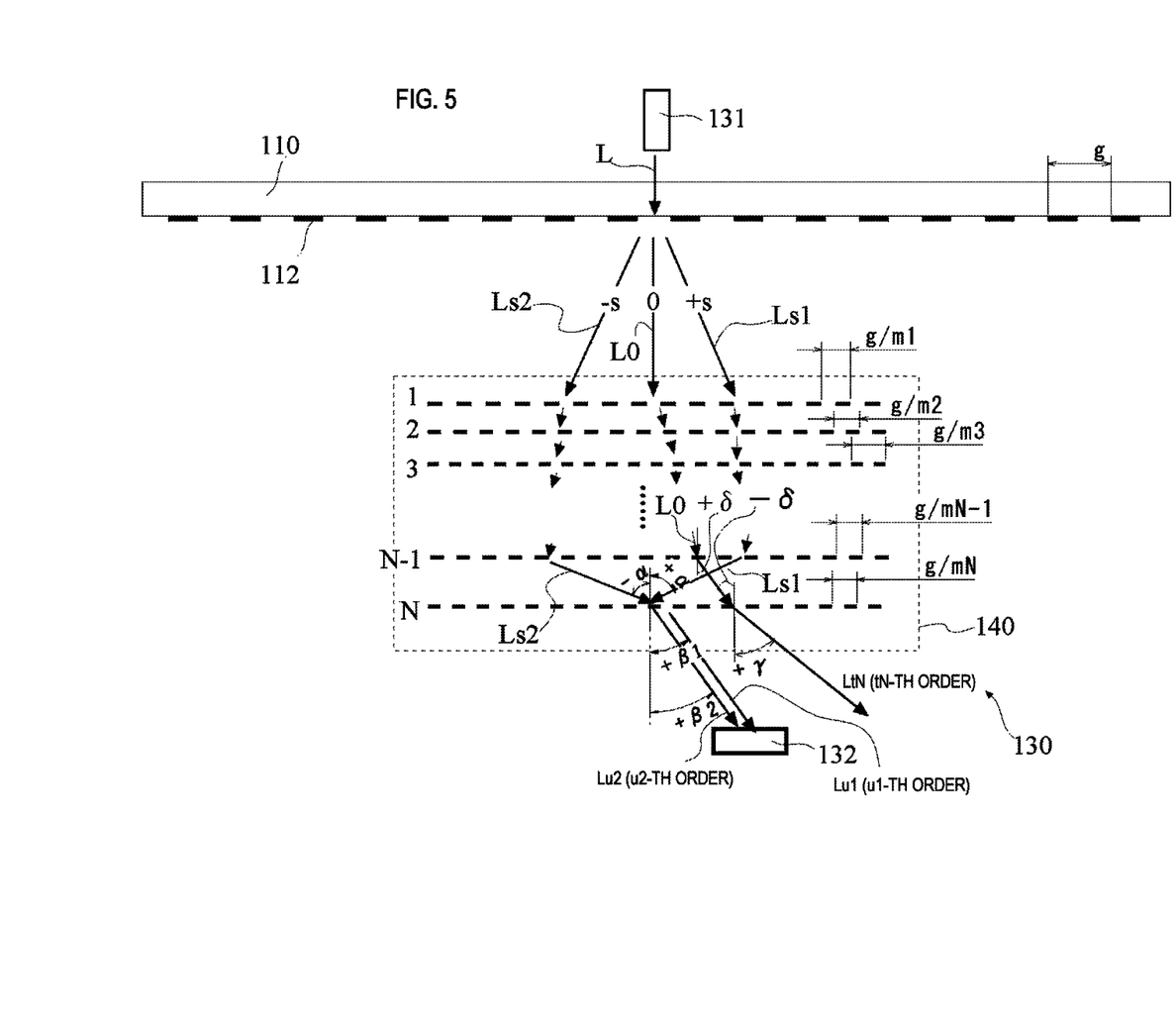
FIG. 5 is a view for explaining the present invention.
Figure 6:
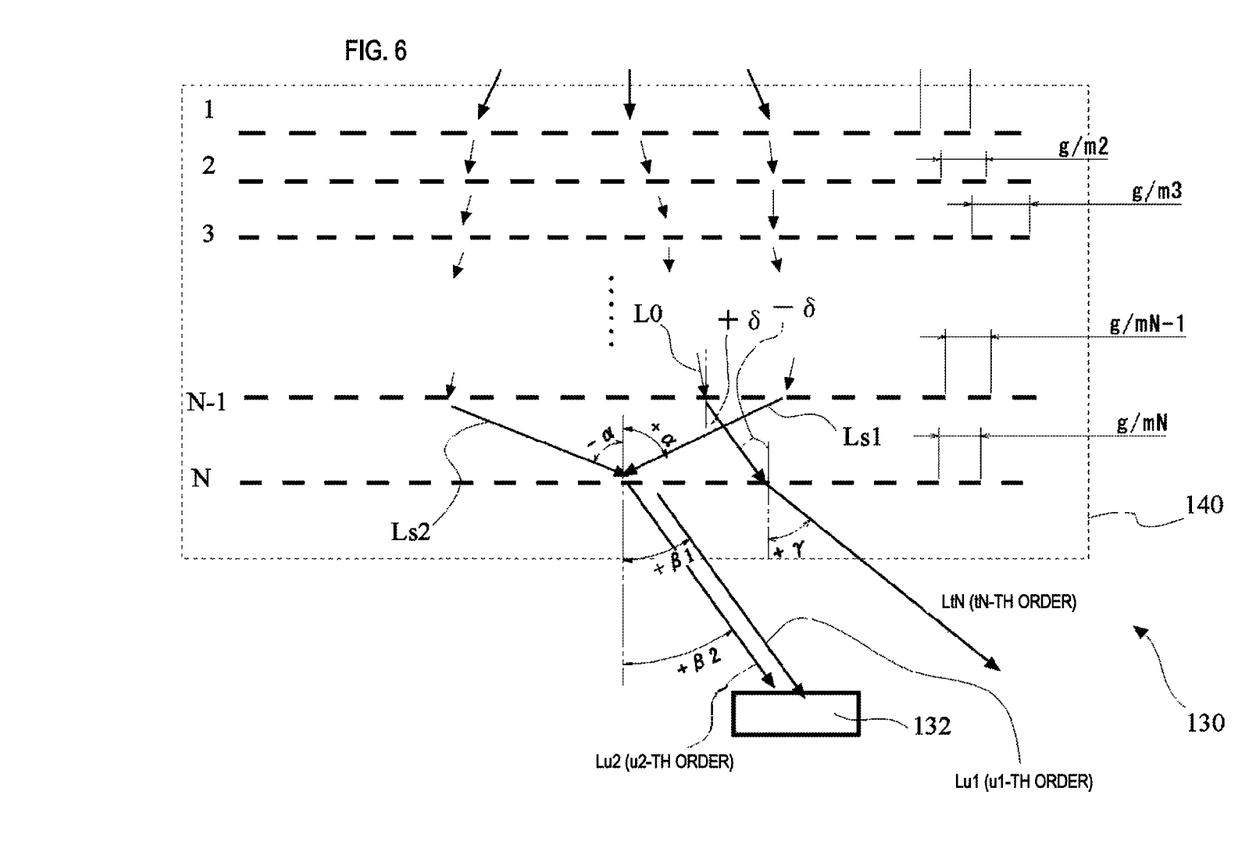
FIG. 6 is a view for explaining the present invention.

With reference to FIGS. 4, 5, and 6, the present invention will be described.

FIG. 6 is an enlarged view of a portion of FIG. 5.

A displacement detecting device 100 includes a main scale 110, and a detecting head unit 130 which can relatively move with respect to the main scale 110.

The main scale 110 includes a diffraction grating 112 along the longitudinal direction of the main scale which is the length measurement axis direction. Here, for the timing being, it is assumed that the diffraction grating is a transmission type. However, the diffraction grating may be a reflection type.

In order for explanation, the longitudinal direction (length measurement axis direction) of the main scale 110 is taken as an X axis, and the transverse direction of the main scale 110 is taken as a Y axis, and the direction of the normal to the main scale 110 is taken as a Z axis.

The main scale 110 is, for example, a scale which is configured by depositing a thin metal film on a glass substrate.

After a metal such as aluminum, chrome, or gold is deposited on the glass substrate, etching is performed, whereby the diffraction grating 112 having a grating pitch "g" is patterned.

However, the method of forming the diffraction grating is not particularly limited. For example, the diffraction grating 112 may be formed by forming ridges and grooves with a transparent resin on the glass substrate or by cutting some portions out of a non-transmissive member.

The detecting head unit 130 includes a light source 131, an index scale group 140, and a light receiving unit 132.

The light source 131 is a light source for emitting a laser beam, and may be, for example, a laser diode (LD). The light source 131 emits light L along the Z axis, and the light L enters the main scale 110 at a right angle. However, since the light source needs only to be able to emit coherent light, the type of the light source is not limited.

After entering the main scale 110, the light L is diffracted by the diffraction grating 112 of the main scale 110. At this time, diffracted lights having various orders such as positive and negative first orders, positive and negative second orders, and positive and negative s-th orders are produced, and there is a zero-order light L0 having passed through the diffraction grating without being diffracted.

The index scale group 140 is composed of a plurality of (two or more) index scales, and the plurality of (two or more) index scales is arranged side by side at predetermined intervals.

Since the main scale 110 is the transmission type, the index scale group 140 is positioned on the opposite side of the main scale 110 to the light source 131.

Here, the index scales are given numbers 1, 2, 3, ..., N−1, and N, in order from the side near the main scale 110. Also, the grating pitches of the individual index scales are expressed as follow. In other words, the grating pitch P0 of the main scale 110, the grating pitch P1 of the first index scale, the grating pitch P2 of the second index scale, the grating pitch P3 of the third index scale, ..., the grating pitch PN−1 of the (N−1)-th index scale, and the grating pitch PN of the N-th index scale are expressed as follow.

$$P0 = g$$
$$P1 = g/m1$$
$$P2 = g/m2$$
$$P3 = g/m3$$
$$\ldots$$
$$PN\text{-}1 = g/mN\text{-}1$$
$$PN = g/mN$$

Here, "mi" is a positive number (a real number).

The light receiving unit 132 is a photoelectric conversion element having a light receiving device.

In this configuration, light paths from the light source 131 to the light receiving unit 132 are as shown in FIG. 5. In other words, the light source light L from the light source 131 enters the main scale 110 at a right angle, whereby diffracted lights and a zero-order transmitted light are produced.

Here, it is assumed that it is desired to make the positive and negative s-th order diffracted lights of the diffracted lights from the main scale 110 finally enter the light receiving unit 132 and be used in measurement (wherein "s" is an integer of 1 or greater).

The light path of the positive s-th order diffracted light Ls1 of the diffracted lights from the main scale 110 will be described.

The positive s-th order diffracted light Ls1 of the diffracted lights from the main scale 110 enters the index scale group 140. Then, the positive s-th order diffracted light Ls1 is diffracted a plurality of times while passing through the individual index scales 1 to N.

Needless to say, the positive s-th order diffracted light Ls1 may pass through each of some of the index scales 1 to N, as a zero-order transmitted light, without being diffracted.

It is noted an area in which the positive s-th order diffracted light Ls1 is emitted from the index scale group 140. In other words, it is noted a light path along which the positive s-th order diffracted light Ls1 enters the N-th index scale from the (N−1)-th index scale, and is emitted from the N-th index scale, and reaches the light receiving unit 132.

It is assumed that an incidence angle at which the positive s-th order diffracted light Ls1 enters the N-th index scale from the (N−1)-th index scale is +α. Further, the positive s-th order diffracted light Ls1 is diffracted by the N-th index scale (or passes through the N-th index scale), and is emitted from the N-th index scale.

It is assumed that the positive s-th order diffracted light Ls1 is diffracted by (or passing through) the N-th index scale, whereby multiple diffracted lights are produced, and the u1-th order light Lu1 of those diffracted lights enters the light receiving unit 132.

Also, it is assumed that an emission angle at which the u1-th order light Lu1 is emitted from the N-th index scale is +β1.

Now, the light path of the negative s-th order diffracted light Ls2 of the diffracted lights from the main scale 110 will be described.

The negative s-th order diffracted light Ls2 of the diffracted lights from the main scale 110 enters the index scale group 140.

While passing through the individual index scales, the negative s-th order diffracted light Ls2 is diffracted a plurality of times or passes through each of some index scales, as a zero-order transmitted light, without being diffracted.

It is noted an area in which the negative s-th order diffracted light Ls2 is emitted from the index scale group 140. In other words, it is noted a light path along which the negative s-th order diffracted light Ls2 enters the N-th index scale from the (N−1)-th index scale, and is emitted from the N-th index scale, and reaches the light receiving unit 132.

It is assumed that an incidence angle at which the negative s-th order diffracted light Ls2 enters the N-th index scale from the (N−1)-th index scale is −α.

In order for the positive s-th order diffracted light Ls1 and the negative s-th order diffracted light Ls2 to be finally detected as an interference signal on the light receiving unit 132, the light path of the positive s-th order diffracted light Ls1 and the light path of the negative s-th order diffracted light Ls2 should be symmetrical (that is, have the same light path length). Therefore, if the incidence angle at which the positive s-th order diffracted light Ls1 enters the N-th index scale is +α, the incidence angle at which the negative s-th order diffracted light Ls2 enters the N-th index scale is necessarily −α.

Further, the negative s-th order diffracted light Ls2 is diffracted by the N-th index scale (or passes through the N-th index scale), and is emitted from the N-th index scale. It is assumed that the negative s-th order diffracted light Ls2 is diffracted by (or passing through) the N-th index scale, whereby multiple diffracted lights are produced, and the u2-th order light Lu2 of those diffracted lights enters the light receiving unit 132.

Also, it is assumed that an emission angle at which the u2-th order light Lu2 is emitted from the N-th index scale is +β2.

Finally, the light path of the zero-order light L0 having passed through the main scale 110 will be described.

The zero-order light L0 having passed through the main scale 110 enters the index scale group 140, and is diffracted a plurality of times by or passes through the index scale group, and is emitted from the index scale group 140.

It is noted an area in which the zero-order light L0 is emitted from the index scale group 140.

In other words, it is noted a light path along which the zero-order light L0 enters the N-th index scale from the (N−1)-th index scale, and is emitted from the N-th index scale.

It is assumed that an angle at which the zero-order light L0 is emitted from the (N−1)-th index scale is +δ (see FIG. 6).

An incidence angle at which the zero-order light L0 enters the N-th index scale is an alternate angle corresponding to the emission angle +δ, and thus becomes −δ.

Further, the zero-order light L0 is diffracted by the N-th index scale (or passes through the N-th index scale), and is emitted from the N-th index scale.

The order of diffraction when the zero-order light L0 having passed through the main scale 110 is diffracted by the i-th index scale of the index scale group 140 is represented by "ti" (wherein "ti" is an integer).

Also, the zero-order light L0 from the main scale 110 is diffracted by (or passes through) the N-th index scale, thereby being split into a plurality of lights, which will be referred to collectively as the tN-th order light LtN.

It is assumed that an emission angle at which the tN-th order light LtN is emitted from the N-th index scale is +γ.

The purpose of the present invention is to prevent the tN-th order light LtN from entering the light receiving unit 132.

As the result of earnest research, the inventor of the present invention found that if an optical system is designed so as to satisfy the following two conditions, it is possible to secure high accuracy ad robustness in a photoelectric encoder 100 having the above described configuration.

(First Condition)

$$\lambda \times (u1-u2) \times (mN+g) = 2 \times \sin \alpha \quad \text{(Expression 1)}$$

(Second Condition)

$$\lambda \times u1 \times (mN+g) - \sin \alpha \neq \lambda + g \times \Sigma_{i=1}^{N}(ti \times mi) \quad \text{(Expression 2)}$$

Here, "λ" is the wavelength of the light source light.

Also, "ti" represents the order of diffraction when the zero-order light L0 having passed through the main scale 110 is diffracted by the i-th index scale of the index scale group 140.

(Derivation of First Condition Expression)

Derivation of each of the first condition and the second condition will be described.

First, the first condition expression will be described.

The first condition is a condition which should be satisfied in order for the positive s-th order diffracted light Ls1 and the negative s-th order diffracted light Ls2 of the diffracted lights from the main scale 110 to be superimposed on each other and enter the light receiving unit 132.

Expression (diffraction condition expression) which should be satisfied in order for the positive s-th order diffracted light Ls1 to be emitted from the N-th index scale at the diffraction angle β1 and enter the light receiving unit 132 is expressed as follows.

$$\sin \alpha + \sin \beta1 = \lambda \times u1 \times (mN \div g) \quad \text{(Expression 3)}$$

Expression (diffraction condition expression) which should be satisfied in order for the negative s-th order diffracted light Ls2 to be emitted from the N-th index scale at the diffraction angle β2 and enter the light receiving unit 132 is expressed as follows.

$$\sin(-\alpha) + \sin \beta2 = \lambda \times u2 \times (mN \div g) \quad \text{(Expression 4)}$$

In order for the positive s-th order diffracted light Ls1 and the negative s-th order diffracted light Ls2 to be superimposed on each other and enter the light receiving unit 132, β1 should be equal to β2, that is, sin β1 should be equal to sin β2.

Expression 3 can be expressed as follows.

$$\sin \beta1 = \lambda \times u1 \times (mN \div g) - \sin \alpha \quad \text{(Expression 5)}$$

Expression 4 can be expressed as follows.

$$\sin \beta2 = \lambda \times u2 \times (mN \div g) - \sin(-\alpha) \quad \text{(Expression 6)}$$

Therefore, the first condition can be derived as follows.

$$\lambda \times u1 \times (mN \div g) - \sin \alpha = \lambda \times u2 \times (mN \div g) - \sin(-\alpha)$$

$$\lambda \times (u1 - u2) \times (mN \div g) = 2 \times \sin \alpha \quad \text{(Expression 1)}$$

(Derivation of Second Condition Expression)

Now, the second condition expression will be described.

The order of diffraction when the zero-order light L0 having passed through the main scale 110 is diffracted by the i-th index scale of the index scale group 140 is represented by "ti".

Also, the zero-order light L0 from the main scale 110 is diffracted by (or passes through) the N-th index scale, thereby being split into a plurality of lights, which will be referred to collectively as the tN-th order light LtN.

The second condition expression is a condition expression which should be satisfied in order to prevent the tN-th order light LtN from entering the light receiving unit 132.

It is assumed that the zero-order light L0 from the main scale 110 is diffracted by each of the first to (N−1)-th index scales, and enters the N-th index scale at the angle −δ, and is emitted from the N-th index scale at the angle γ. In this case, the diffraction expression becomes as follows.

$$\sin(-\delta) + \sin \gamma = \lambda \times tN \times (mN \div g) \quad \text{(Expression 7)}$$

Here, sin δ can be expressed as follows.

$$\sin \delta = +\Sigma_{i=1}^{N-1}\{ti \times \lambda \times (mi \div g)\} \quad \text{(Expression 8)}$$

Here, "ti" represents the order of diffraction when the zero-order light L0 having passed through the main scale 110 is diffracted by the i-th index scale of the index scale group 140, as described above.

In order to prevent the tN-th order light LtN from entering the light receiving unit 132, γ should be different from β1, that is, sin γ should be different from sin β1.

If the condition that γ should be different from β1 is satisfied, on the basis of the first condition expression, the condition that γ should be different from β2 is automatically satisfied.

Expression 7 can be expressed as follows.

$$\sin \gamma = \lambda \times tN \times (mN \div g) - \sin(-\delta) \quad \text{(Expression 9)}$$

If the right-hand side of Expression 8 is substituted in Expression 9, the follow expression is obtained.

$$\sin \gamma = \lambda \times tN \times (mN \div g) + \Sigma_{i=1}^{N-1}\{ti \times \lambda \times (mi \div g)\} \quad \text{(Expression 10)}$$

Expression 10 can be simply expressed as follows.

$$\sin \gamma = (\lambda \div g) \times \Sigma_{i=1}^{N}(ti \times mi) \quad \text{(Expression 11)}$$

Therefore, on the basis of the condition that sin γ should be different from sin β1, the second condition expression is obtained as follows.

$$\lambda \times u1 \times (mN \div g) - \sin \alpha \neq (\lambda \div g) \times \Sigma_{i=1}^{N}(ti \times mi) \quad \text{(Expression 2)}$$

If the setting (design) of the optical system of the photoelectric encoder 100 satisfies the first condition expression (Expression 1) and the second condition expression (Expression 2) described above, since the signal lights (the positive and negative s-th order lights Ls1 and Ls2) and the zero-order light L0 from the main scale 110 are separated, it is possible to implement ideal high detection accuracy.

Further, since the positive and negative s-th order lights Ls1 and Ls2 are used as signal lights, the light paths of the signal lights (the positive and negative s-th order lights Ls1 and Ls2) necessarily have a symmetrical structure. Therefore, it is possible to secure robustness to variation in the wavelength of light of the light source 131.

Also, since a mask or an aperture for blocking the zero-order light is not necessary unlikely in the related technology, it is unnecessary to limit the beam diameter of the light source light L.

For example, by setting the beam diameter of the light source light L to an appropriate size, it is possible to suppress sensitivity (the rate of change of the amount of light) relative to contamination of the main scale 110, and secure robustness to contamination of the main scale 110.

First Embodiment

Figure 7:
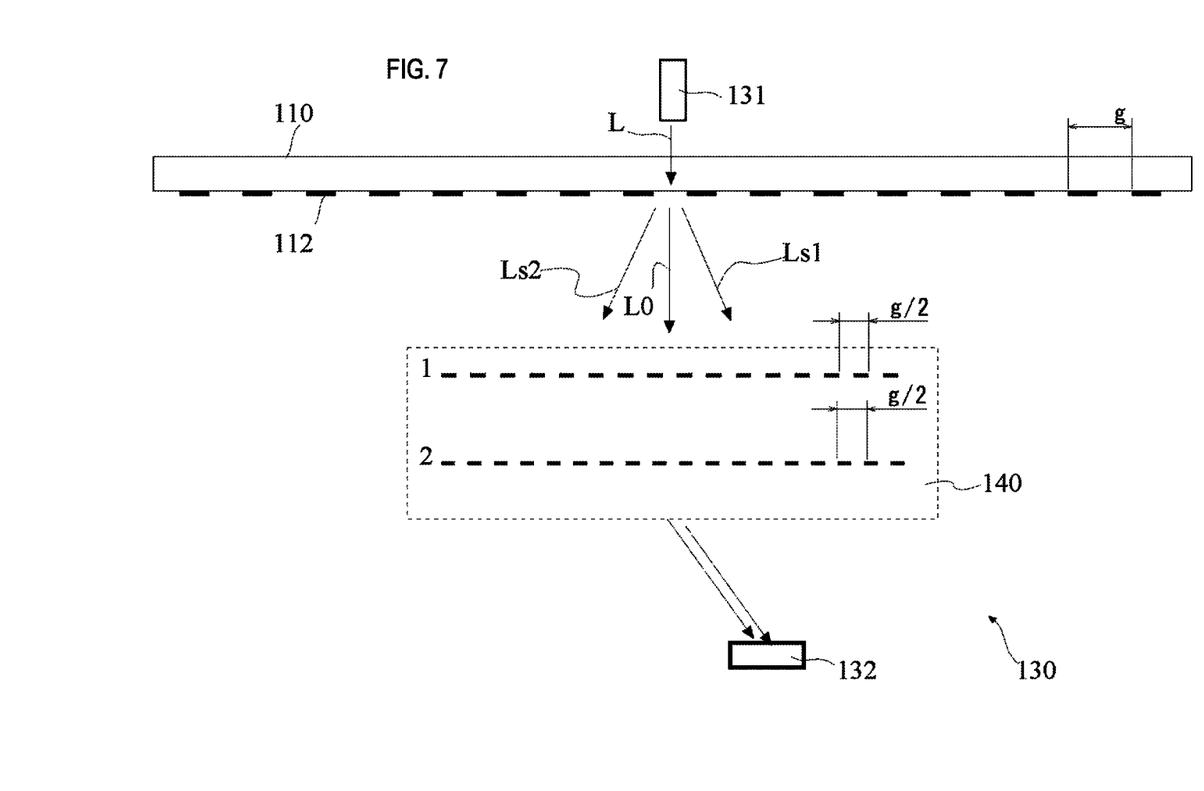
FIG. 7 is a view illustrating a first embodiment based on the present invention.

FIG. 7 shows a first embodiment based on the present embodiment.

It is assumed that the grating pitch of the diffraction grating 112 of the main scale 110 is "g".

The index scale group 140 includes two index scales, that is, a first index scale and a second index scale.

It is assumed that the grating pitches of the first index scale and the second index scale are "g/2".

According to this configuration, it is possible to separate signal lights and a zero-order light.

A case of applying the first condition expression and the second condition expression to the configuration of the first embodiment will be described. Individual parameters are as follow.

A parameter "λ" represents the wavelength of the light source light and is arbitrary.

A parameter "g" represents the grating pitch of the main scale 110, and is arbitrary.

A parameter "N" represents the number of index scales constituting the index scale group 140, and is 2.

A parameter "m1" represents the ratio of the grating pitch of the main scale 110 to the grating pitch of the first index scale, and is 2.

A parameter "m2" represents the ratio of the grating pitch of the main scale 110 to the grating pitch of the second index scale, and is 2.

A parameter "s" represents the order of diffraction of each signal light, and is 1.

A parameter "α" represents an angle at which each signal light enters the second index scale, and is $\sin^{-1}(\lambda/g)$.

A parameter "u1" represents the order of diffraction when one signal light (a positive first-order diffracted light Ls1) is diffracted by the second index scale, and is 1.

A parameter "u2" represents the order of diffraction when another signal light (a negative first-order diffracted light Ls2) is diffracted by the second index scale, and is 0.

The left-hand side of the first condition expression (Expression 1) is calculated as follows.

$$(\text{LEFT-HAND SIDE}) = \lambda \times 1 \times (2 \div g)$$
$$= 2\lambda/g$$

The right-hand side of the first condition expression (Expression 1) is calculated as follows.

$$(\text{RIGHT-HAND SIDE}) = 2 \times \sin(\sin^{-1}(\lambda/g))$$
$$= 2\lambda/g$$

Therefore, the left-hand side is equal to the right-hand side, and thus the first condition expression is satisfied.

Now, the second condition expression is considered.

The left-hand side of the second condition expression (Expression 2) is calculated as follows.

$$(\text{LEFT-HAND SIDE}) = \lambda \times 1 \times (2 \div g) - \quad \text{(Expression 9)}$$
$$\sin(\sin^{-1}(\lambda/g))$$
$$= \lambda/g$$

The right-hand side of the second condition expression (Expression 2) is calculated as follows.

$$(\text{RIGHT-HAND SIDE}) = \lambda \div g \times (t2 \times 2) + \lambda \div \quad \text{(Expression 10)}$$
$$g \times 2 \times t1$$
$$= (t2 + t1) \times 2 \times \lambda/g$$

In the left-hand side of the second condition expression (Expression 2), the coefficient of "λ/g" is 1 which is an odd number.

Meanwhile, in the right-hand side of the second condition expression (Expression 2), the coefficient of "λ/g" is 2 which is an even number.

Therefore, regardless of the values of "t2" and "t1", the left-hand side is different from the right-hand side.

Figure 8:
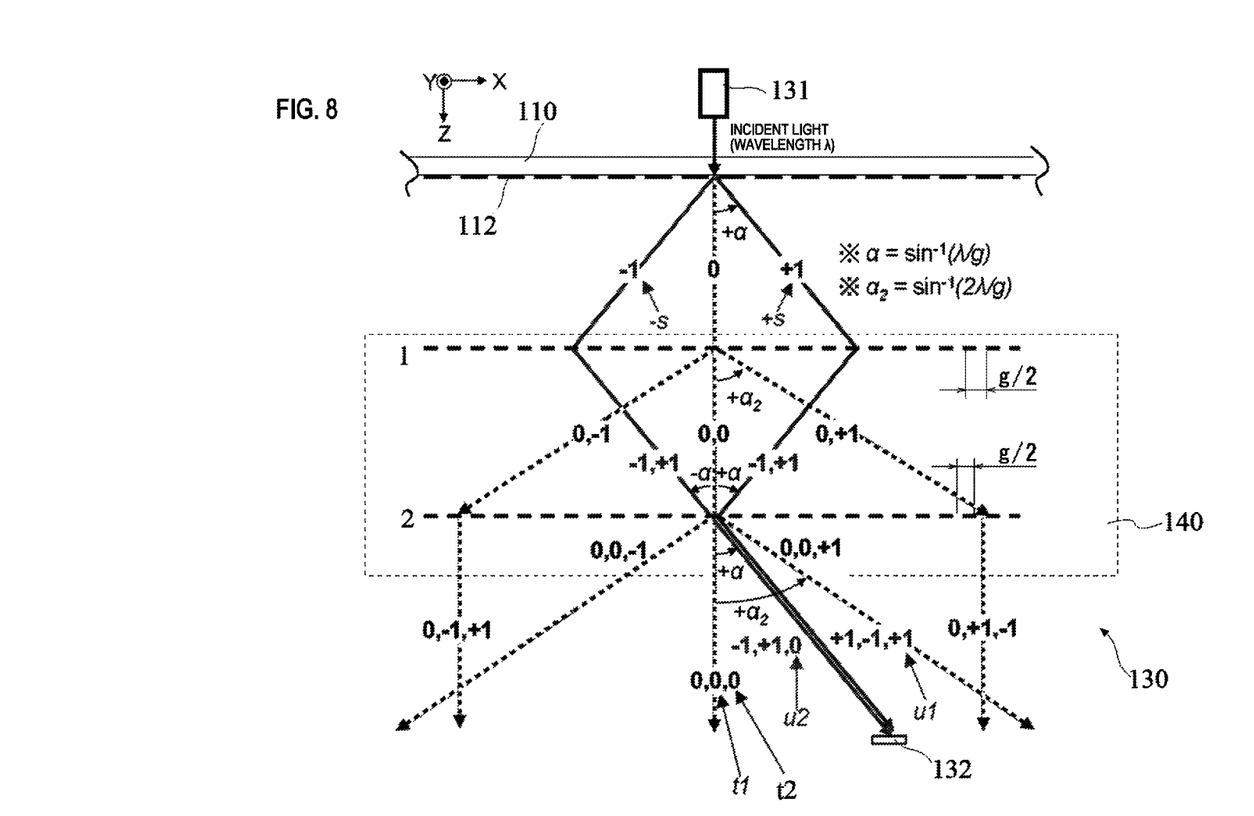
FIG. 8 is a view illustrating the first embodiment based on the present invention.

From FIG. 8 illustrating actual light paths, it can be seen that the zero-order light from the main scale 110 does not enter the light receiving unit 132.

This will be described in more detail.

A portion of the positive first-order diffracted light emitted from the main scale 110 is diffracted by the second index scale, whereby a first-order diffracted light is produced, and this first-order diffracted light is extracted as one signal light.

Also, a portion of the negative first-order diffracted light from the main scale 110 passes through the second index scale, and this passed light (a zero-order light) is extracted as the other signal light.

The location where the first-order diffracted light and the transmitted light (the zero-order light) finally reach is the light receiving unit 132.

The location of the light receiving unit 132 where the signal lights reach is necessarily different from the location where the zero-order light (transmitted light) from the main scale 110 reaches.

The zero-order light from the main scale 110 enters the index scale group 140, and is diffracted by or passes through the first index scale.

In FIG. 8, the positive and negative first-order lights and the transmitted light (the zero-order light) from the first index scale are denoted by (0, +1), (0, −1), and (0, 0), respectively.

Each of these lights (0, +1), (0, −1), and (0, 0) is diffracted by or passes through the second index scale.

For example, the light (0, 0) is diffracted by or passes through the second index scale, thereby being split into a plurality of lights such as lights (0, 0, +1), (0, 0, −1), and (0, 0, 0); however, all of these lights do not reach the light receiving unit 132.

Similarly, all of the diffracted lights (or transmitted lights) of the lights (0, +1) and (0, −1) do not reach the light receiving unit 132.

It can be understood that if the optical system is designed so as to satisfy the first condition expression and the second condition expression as described above, it is possible to separate the signal lights and the zero-order light.

COMPARATIVE EXAMPLE

Now, a comparative example will be described.

Figure 9A:
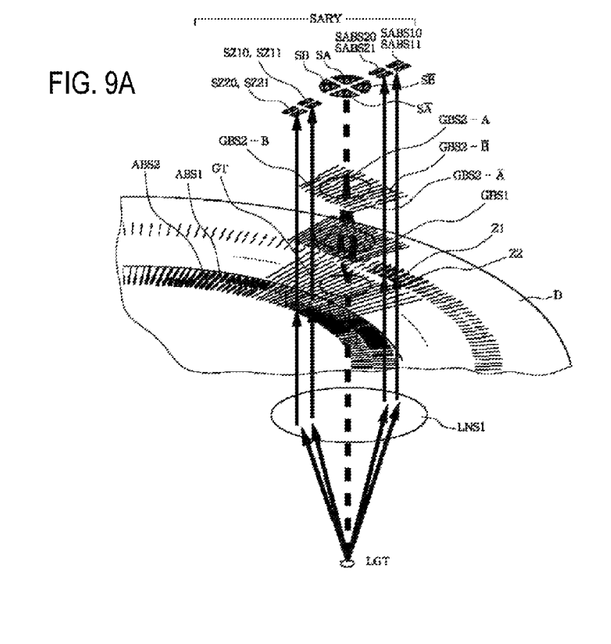
FIGS. 9A and 9B are views illustrating a related technology disclosed in Japanese Patent Application Laid-Open No. 8-219812, as a comparative example.
Figure 9B:
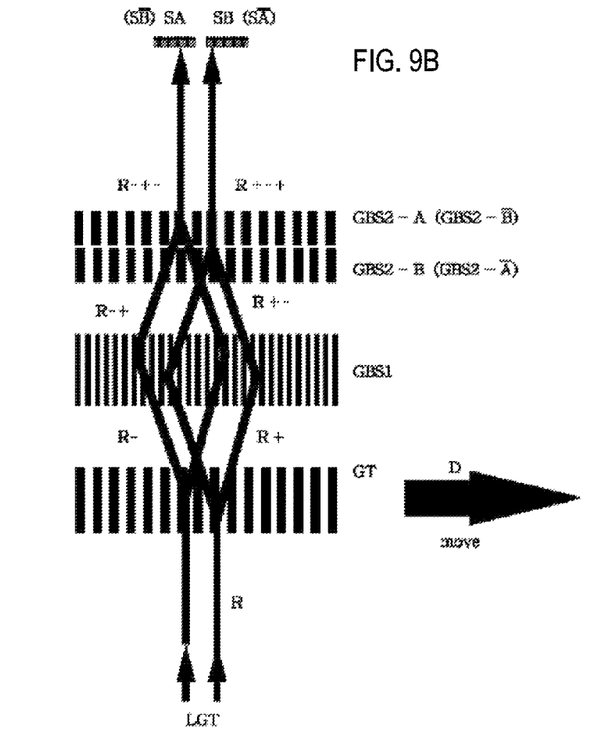

FIGS. 9A and 9B show a related technology disclosed in Japanese Patent Application Laid-Open No. 8-219812.

In this related technology, the ratio of the grating pitch of the main scale 110, the grating pitch of the first index scale, and the grating pitch of the second index scale is 1:1/2:1.

If an optical system having the above-mentioned grating pitch ratio is used, the signal lights and the zero-order light from the main scale 110 are superimposed.

A case of applying the first condition expression and the second condition expression to the related technology will be described. The individual parameters are as follow.

The parameter "λ" represents the wavelength of the light source light and is arbitrary.

The parameter "g" represents the grating pitch of the main scale 110, and is arbitrary.

The parameter "N" represents the number of index scales constituting the index scale group 140, and is 2.

The parameter "m1" represents the ratio of the grating pitch of the main scale 110 to the grating pitch of the first index scale, and is 2.

The parameter "m2" represents the ratio of the grating pitch of the main scale 110 to the grating pitch of the second index scale, and is 1.

The parameter "s" represents the order of diffraction of each signal light, and is 1.

The parameter "α" represents an angle at which each signal light enters the second index scale, and is $\sin^{-1}(\lambda/g)$.

The parameter "u1" represents the order of diffraction when one signal light (a positive first-order diffracted light Ls1) is diffracted by the second index scale, and is 1.

The parameter "u2" represents the order of diffraction when another signal light (a negative first-order diffracted light Ls2) is diffracted by the second index scale, and is −1.

The left-hand side of the first condition expression (Expression 1) is calculated as follows.

$$(\text{LEFT-HAND SIDE}) = \lambda \times (1 - (-1)) \times (1 \div g)$$
$$= 2\lambda/g$$

The right-hand side of the first condition expression (Expression 1) is calculated as follows.

$$(\text{RIGHT-HAND SIDE}) = 2 \times \sin(\sin^{-1}(\lambda/g))$$
$$= 2\lambda/g$$

Therefore, the left-hand side is equal to the right-hand side, and thus the first condition expression is satisfied.

In other words, it is possible to detect an interference signal based on the signal lights by the light receiving unit 132.

Now, the second condition expression will be described.
The left-hand side of the second condition expression (Expression 2) is calculated as follows.

$$(\text{LEFT-HAND SIDE}) = \lambda \times 1 \times (1 \div g) - \sin(\sin^{-1}(\lambda/g)) \quad (\text{Expression 11})$$
$$= 0$$

The right-hand side of the second condition expression (Expression 2) is calculated as follows.

$$(\text{RIGHT-HAND SIDE}) = \lambda \div g \times (t2 \times 2) + \lambda \div g \times 2 \times t1 \quad (\text{Expression 12})$$
$$= (t2 + t1) \times 2 \times \lambda/g$$

The left-hand side of the second condition expression (Expression 2) is 0.

The right-hand side of the second condition expression (Expression 2) can become 0 by a certain combination of "t2" and "t1".

Therefore, the left-hand side and the right-hand side can be equal to each other, so the zero-order light from the main scale 110 enters the light receiving unit 132.

Figure 10:
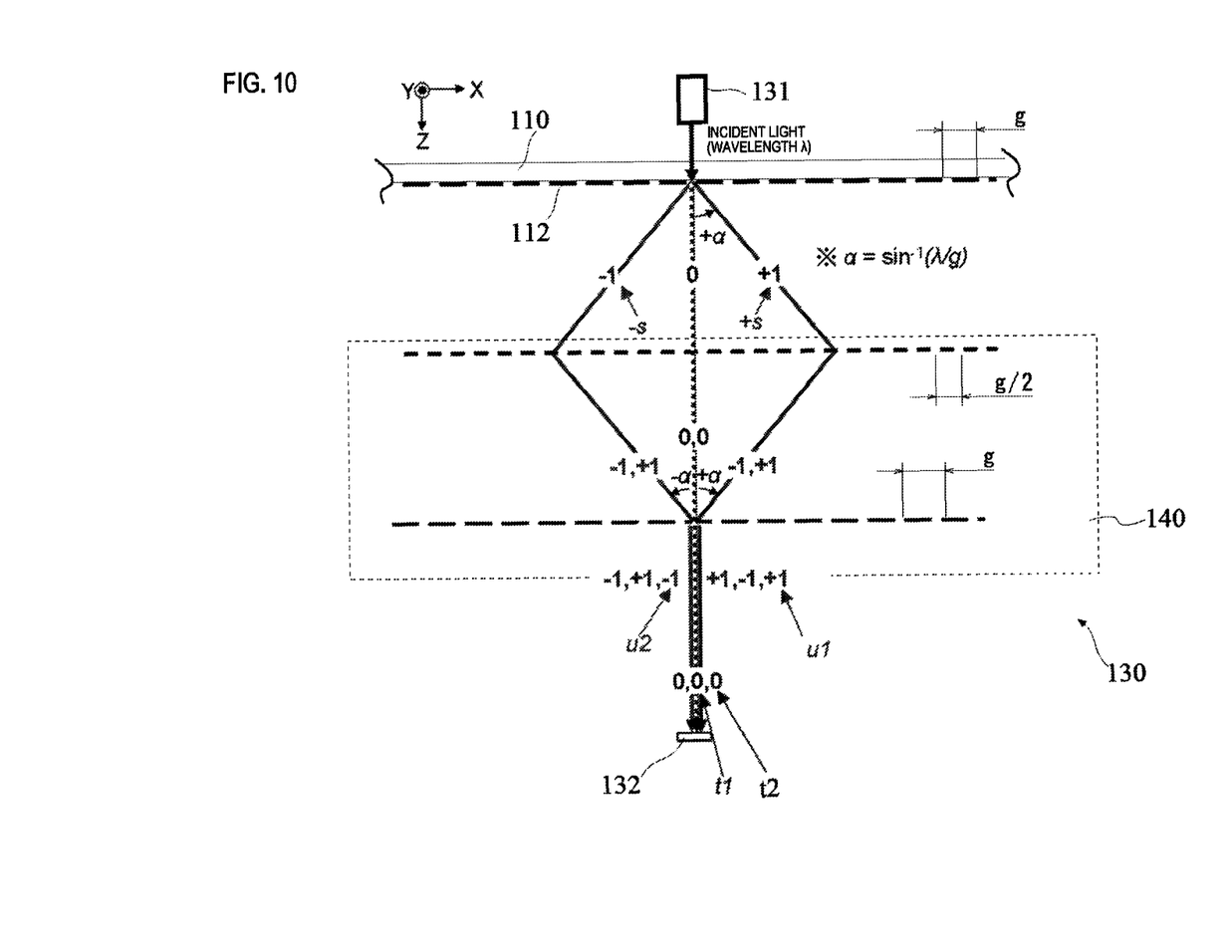
FIG. 10 is a view illustrating the comparative example which is the related technology disclosed in Japanese Patent Application Laid-Open No. 8-219812.

From FIG. 10 illustrating actual light paths, it can be seen that the zero-order light from the main scale 110 enters the light receiving unit 132.

Also, it can be seen that the related technology in which the transmitted light (zero-order light) of the main scale 110 is mixed with the signal lights does not belong to the technical scope of the present invention.

Also, the present invention is not limited to the embodiment described above, and can be appropriately modified without departing from the scope.

For example, even if the main scale is a reflection type, the present invention is valid.

What is claimed is:

1. A displacement detecting device comprising:
   a main scale including a diffraction grating; and
   a detecting head unit that is disposed so as to be relatively movable with respect to the main scale, and detects the amount of relative displacement to the main scale,
   wherein the detecting head unit includes:
      a light source that emits light toward the main scale;
      a light receiving unit that receives signal lights diffracted by the main scale, the signal lights being a positive s-th order diffracted light and a negative s-th order diffracted light of diffracted lights from the main scale, and
      an index scale group that is disposed in the middle of a light path from the main scale to the light receiving unit, the index scale group including two or more index scales including diffraction gratings, respectively, and
   wherein the displacement detecting device satisfies a first condition and a second condition,
   the first condition being expressed as follows:

$\lambda \times (u1 - u2) \times (mN \div g) = 2 \times \sin \alpha$, the second condition being expressed as follows:

$\lambda \times u1 \times (mN \div g) - \sin \alpha \neq \lambda \div g \times \Sigma_{i=1}^{N}(ti \times mi)$, wherein
      "λ" is the wavelength of the light source light,
      "s" is an integer of 1 or greater,
      "N" is the number of the plurality of index scales constituting the index scale group,
      P0 is the grating pitch of the main scale, and is "g",
      P1, P2, P3, . . . , Pi, . . . , PN−1, and PN are the grating pitches of corresponding scales, respectively, when the index scales are given numbers 1, 2, 3, . . . , N−1, and N, in order from the side near the main scale, and are g/m1, g/m2, g/m3, . . . , g/mi, . . . , g/mN−1, and g/mN wherein "mi" is a ratio of the grating pitch of the main scale to the grating pitch of the i-th index scale,
      +α is an incidence angle at which the positive s-th order diffracted light enters the N-th index scale from the (N−1)-th index scale,
      u1 is the order of diffraction of light which is one of lights into which the positive s-th order diffracted light from the main scale is split when being diffracted by (or passing through) the N-th index scale, and enters the light receiving unit, and is an integer,
      u2 is the order of diffraction of light which is one of lights into which the negative s-th order diffracted light from the main scale is split when being diffracted by (or passing through) the N-th index scale, and enters the light receiving unit, and is an integer, and
      "ti" is the order of diffraction when a zero-order light having passed through the main scale is diffracted by the i-th index scale of the index scale group.

2. The displacement detecting device according to claim 1, wherein:
   N, m1, m2, u1, and u2 are 2, 1, 2, 1, and 0, respectively.

* * * * *